Oct. 19, 1965 C. W. CLARAS ETAL 3,213,198
STEREOPHONIC-MONOPHONIC AMPLIFIER
Filed June 11, 1962
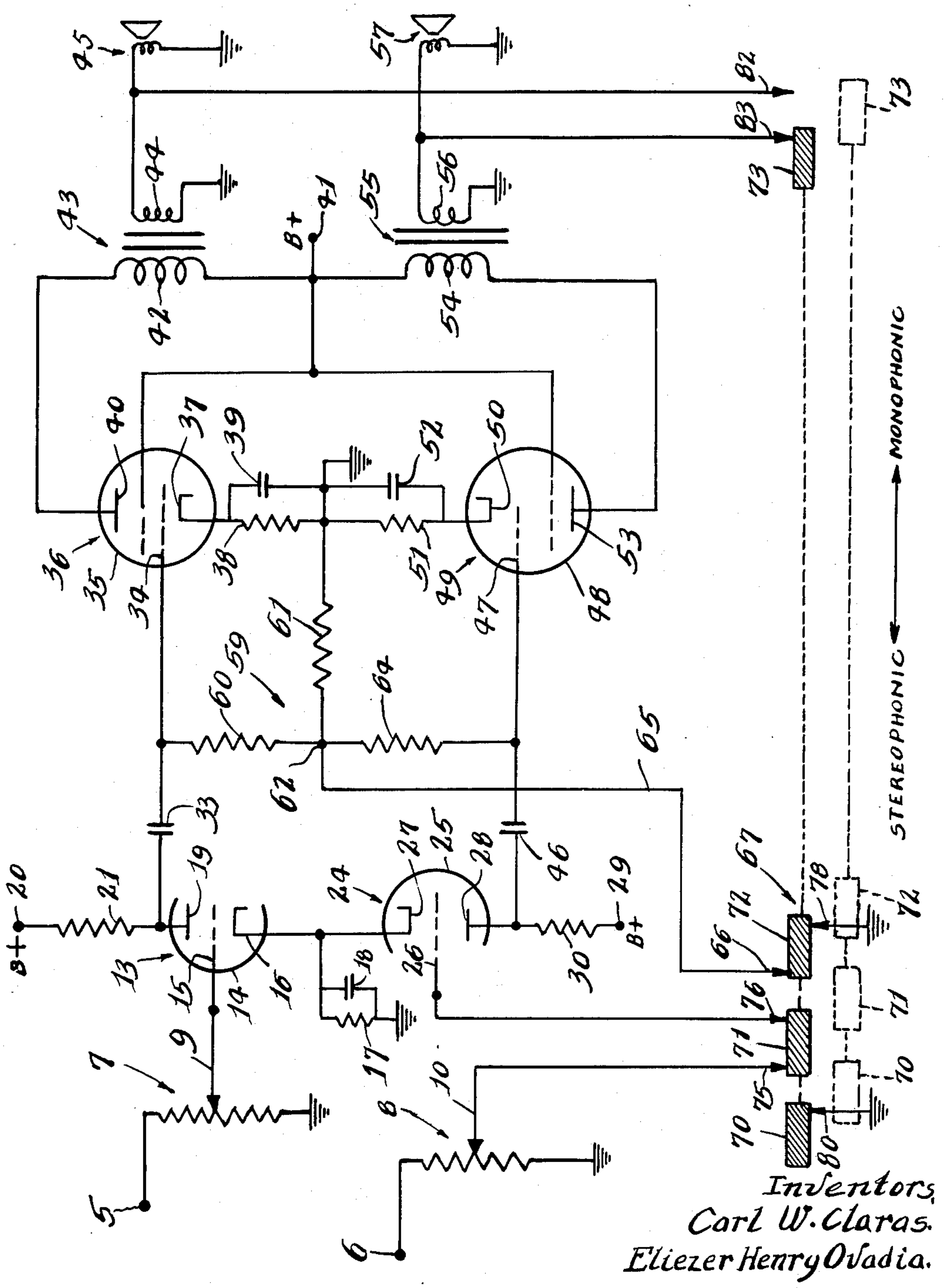
Inventors,
Carl W. Claras.
Eliezer Henry Ovadia.
By. Zabel, Baker, York, Jones & Dithmar
Attorneys.

United States Patent Office 3,213,198

Patented Oct. 19, 1965

3,213,198

STEREOPHONIC-MONOPHONIC AMPLIFIER

Carl W. Claras, Western Springs, and Eliezer Henry Ovadia, Chicago, Ill., assignors, by mesne assignments, to Minnesota Mining and Manufacturing Company, St. Paul, Minn., a corporation of Delaware Filed June 11, 1962, Ser. No. 201,341
4 Claims. (Cl. 179—1)

This invention relates to a stereophonic-monophonic amplifier suitable for use in tape recorders, record players, or other audio apparatus designed for both stereophonic and monophonic operation.

One object of the invention is to provide an amplifier of this type wherein all major components may be used to maximum capability in each alternative manner of operation.

Another object is to provide an amplifier of this type which readily is conditioned for either stereophonic or monophonic operation by the simple setting of a single switch.

Other objects, advantages and details of the invention will be apparent as the description proceeds, reference being had to the accompanying drawing wherein one form of the invention is shown. It will be understood that the description and drawing are illustrative only, and that the scope of the invention is to be measured by the appended claims.

In the drawing:

The single figure of the drawing illustrates in simplified schematic form a stereophonic-monophonic amplifier embodying the invention.

Referring to the drawing, the illustrated stereophonic-monophonic amplifier includes a first signal input terminal 5 and a second signal input terminal 6. Both terminals, of course, are used when amplifying stereophonic signals. As shown, terminal 5 constitutes the single input for monophonic operation.

In the form of the invention shown, input terminals 5 and 6 are connected respectively to volume controls 7 and 8 having resistances of 2 megohms, for example. Volume control 7 has a movable arm 9 while volume control 8 has a movable arm 10.

A first driver stage 13 includes a vacuum tube 14 or equivalent which, as shown, is one of two tube units contained in a single envelope. By way of example, a suitable twin tube is a 6EU7. Control grid 15 of tube 14 is connected to arm 9 of volume control 7.

Cathode 16 of tube 14 is grounded through bias resistance 17 (e.g., 1.8K) having bypass capacitance 18 (e.g., 40 mf.), and anode 19 connected to a source of high voltage 20 through resistance 21 (e.g. 360K).

A second driver stage 24 includes vacuum tube 25 or equivalent which as shown is the other tube unit in the envelope containing tube 14. Grid 26 of tube 25 is selectively adapted to be connected to arm 10 of volume control 8 and to a point in the output circuit of first driver stage 13, as will be seen. The drawing illustrates connection between grid 26 and arm 10, the connection used for stereophonic operation.

Cathode 27 of tube 25 is grounded through aforesaid bias resistance 17 and bypass capacitance 18. Anode 28 is connected to high voltage source 29 through resistance 30 (e.g. 360K).

The output of first driver stage 13 is applied through coupling capacitance 33 (e.g., 0.05 mf.) to grid 34 of vacuum tube 35 or equivalent which forms part of a first power amplifier stage 36. Tube 35, for example, may be a 7591. Cathode 37 of tube 35 is grounded through bias resistance 38 (e.g. 110 ohms) having bypass capacitance 39 (e.g., 100 mf.). Anode 40 is connected to a high voltage source 41 through an output element which is shown as primary 42 of output transformer 43. Secondary winding 44 of transformer 43 is shown connected to a speaker 45.

The output of second driver stage 24 is connected through coupling capacitance 46 (e.g., 0.05 mf.) to grid 47 of a vacuum tube 48 or equivalent which forms part of a second power amplifier stage 49. Tube 48, like tube 35, may be a 7591. Cathode 50 of tube 48 is grounded through bias resistance 51 (e.g. 110 ohms) and associated bypass capacitance 52 (e.g., 100 mf.). Anode 53 is connected to high voltage source 41 through an output element which is here shown as primary winding 54 of an output transformer 55. Secondary winding 56 of transformer 55 is shown connected to speaker 57.

A voltage divider means 59 is connected between the output of first driver stage 13 and ground. As shown, this means is a voltage divider network comprising series-connected resistances 60 and 61. By way of example, resistances 60 and 61 may have values of 470K and 360K, respectively. The common junction of resistances 60 and 61 is designated 62 and hereinafter sometimes referred to as an intermediate tap.

A balancing resistance 64 is connected between the output of second driver stage 24 and junction 62. Resistance 64 desirably has the same value as resistance 60.

Junction 62 is connected by lead 65 to terminal 66 of a switch means 67 which now will be described.

Switch means 67 is operable to condition the amplifier for either stereophonic or monophonic operation. Thus, switch means 67 has two positions, one for stereophonic operation (full line) and one for monophonic operation (broken line). In the drawing, switch means 67 is shown in stereophonic position, that is, the movable switch elements are positioned at the left. These elements are moved to right hand position for monophonic operation, as indicated by the legend and shown in broken line.

In the example shown, switch means 67 has four movable conducting switch elements which are ganged together for simultaneous movement in response to a single actuator (not shown). These movable elements are designated 70, 71, 72 and 73.

When switch means 67 has its movable switch elements in the illustrated left hand position, the respective elements provide connections for stereophonic operation. Thus, movable element 71 which in this position bridges switch terminals 75 and 76 connects movable arm 10 of volume control 8 to grid 26 of tube 25 and applies a signal from second input terminal 6 to second driver stage 24.

Movable element 72 bridges switch terminal 66 and grounded switch terminal 78, thereby grounding junction 62, the intermediate tap of voltage divider means 59, and shorting resistance 61. This conditions the two power amplifier stages 36 and 49 to amplify the respective two signals received from driver stages 13 and 24. The outputs of the amplifier stages 36 and 49 are applied respectively to separate transformers 43 and 55 which in turn separately drive the illustrated speakears 45 and 57. This provides desired amplification for stereophonic signals.

When switch means 67 is in the broken line right hand position the movable switch elements provide connections for monophonic operation wherein a single signal is applied to input terminal 5. Thus, movable element 70 bridges switch terminal 75 and grounded terminal 80, thereby deactivating the second signal input terminal 6.

Movable element 71 bridges switch terminals 66 and 76 and establishes connection between intermediate tap or junction 62 and grid 26 of tube 25. With this connection a portion of the output of first driver stage 13 is applied from voltage divider means 59 to the input of second driver stage 24. The signal appearing at the output of second driver stage 24 is, of course, in phase opposition to the signal at the output of first driver stage 13.

The two signals from the driver stages 13 and 24 are applied respectively to power amplifier stages 36 and 49 which in this circumstance function together as a push-pull power amplifier.

Movable switch element 73 in broken line position bridges switch terminals 82 and 83 which respectively are connected to transformer secondaries 44 and 56, thereby connecting the secondaries in parallel. Thus the single signal applied to input terminal 5 is amplified in all major components of the amplifier. The illustrated speakers 45 and 57 are driven in parallel by the output of the monophonic push-pull amplifier.

From the above description it is thought that the construction and advantages of the invention will be readily apparent to those skilled in the art. Various changes in detail may be made without departing from the spirit or losing the advantages of the invention.

Having thus described the invention, what we claim as new and desire to secure by Letters Patent is:

1. A stereophonic-monophonic amplifier selectively providing a pair of power amplifiers for stereophonic signals and a push-pull power amplifier for monophonic signals, said amplifier using all major components to maximum capability in each alternative and comprising:

first and second signal input terminals;

a first driver stage having an input connected to said first signal input terminal;

a second driver stage having an input selectively connected to said second signal input terminal and to the output of said first driver stage;

first and second power amplifier stages having inputs respectively coupled to the outputs of said first and second driver stages;

first and second output transformers having primary windings respectively connected to the outputs of said first and second power amplifier stages and secondary windings connected to associated speakers;

a voltage divider network connected between the output of said first driver stage and ground and having an intermediate tap selectively connected to ground and to the input of said second driver stage; and switch means in one position connecting said second signal input terminal to the input of said second driver stage and said intermediate tap on said voltage divider network to ground to establish a pair of power amplifiers for stereophonic signals and in another position connecting said second signal input terminal to ground, said intermediate tap to the input of said second driver stage and the secondary windings of said output transformers together to establish a push-pull power amplifier for monophonic signals.

2. A stereophonic-monophonic amplifier selectively providing a pair of power amplifiers for stereophonic signals and a push-pull power amplifier for monophonic signals, said amplifier using all major components to maximum capability in each alternative and comprising:

a first driver stage having an input connected to a first signal source;

a second driver stage having an input selectively connected to a second signal source and to the output of said first driver stage;

first and second power amplifier stages having inputs respectively coupled to the outputs of said first and second driver stages;

first and second output transformers having primary windings respectively connected to the outputs of said first and second power amplifier stages and secondary windings connected to associated speakers;

a resistance circuit connected between the output of said first driver stage and ground and having an intermediate tap selectively connected to ground and to the input of said second driver stage; and switch means in one position connecting the input of said second driver stage to said second signal source and said intermediate tap to ground to establish a pair of power amplifiers for stereophonic signals and in another position connecting said intermediate tap to the input of said second driver stage and the secondary windings of said output transformers together to establish a push-pull amplifier for monophonic signals.

3. A stereophonic-monophonic amplifier adapted to utilize all major components to maximum capability in both stereophonic and monophonic operation, comprising:

first and second driver stages each having an input and an output;

first and second power amplifier stages each having inputs respectively connected to the outputs of said first and second driver stages;

first and second output transformers respectively connected to the outputs of said first and second power amplifier stages;

a voltage divider network between the output of said first driver stage and ground and having an intermediate tap selectively connected to ground and to the input of said second driver stage; and switch means in one position connecting the input of said second driver stage to an external signal source and said intermediate tap to ground to establish a two-channel amplifier for stereophonic signals and in another position connecting said intermediate tap to the input of said second driver stage and the outputs of said output transformers together to establish a push-pull amplifier for monophonic signals.

4. A stereophonic-monophonic amplifier comprising:

first and second driver stages;

first and second power amplifier stages respectively connected to said first and second driver stages;

first and second output elements respectively connected to said first and second power amplifier stages;

voltage divider means between the output of said first driver stage and ground and having a tap selectively connected to ground and to the input of said second driver stage; and switch means in one position connecting the input of said second driver stage to an external signal source and said tap to ground for stereophonic signals and in another position connecting said tap to the input of said second driver stage and said output elements together for monophonic signals.

References Cited by the Examiner

UNITED STATES PATENTS

| | | | |
|---|---|---|---|
| 2,906,831 | 9/59 | Macdonald | 179—1 |
| 3,026,378 | 3/62 | Fine et al. | 179—1 |

ROBERT H. ROSE, *Primary Examiner.*

WILLIAM C. COOPER, *Examiner.*